United States Patent [19]

Pittet et al.

[11] 3,895,640

[45] July 22, 1975

[54] COMPOSITIONS AND METHODS UTILIZING THIO DERIVATIVES AND PROCESSES FOR PRODUCING SUCH DERIVATIVES

[75] Inventors: Alan O. Pittet, Atlantic Highlands; John V. Pascale, Jackson, both of N.J.; Stuart Patton, State College, Pa.; Michael H. Brodnitz, Matawan, N.J.

[73] Assignee: International Flavors & Fragrances Inc., New York, N.Y.

[22] Filed: Mar. 29, 1974

[21] Appl. No.: 455,986

Related U.S. Application Data

[62] Division of Ser. No. 301,524, Oct. 27, 1972.

[52] U.S. Cl. ............... 131/17 R; 131/2; 131/144; 426/65
[51] Int. Cl.² ........................................ A24B 15/04
[58] Field of Search ............ 131/9, 17, 2, 143, 144, 131/65

[56] References Cited
OTHER PUBLICATIONS

"Tobacco Flavoring for Smoking Products" (text), by Leffingwell, Yound and Bernasek, (1972), 72 pages, p. 21 cited, published by R. J. Reynolds Tobacco Co., Winston–Salem, North Carolina.

"Dangerous Properties of Industrial Materials" (text), by N. Irving Sax, Third Edition, 1251 pages (1968), pp. 1160–1163 inc. cited, pub. by Reinhold Book Corp., New York.

Primary Examiner—Melvin D. Rein
Attorney, Agent, or Firm—Brooks, Haidt, Haffner & Delahunty

[57] ABSTRACT

Processes and compositions for altering the organoleptic properties of tobacco or tobacco substitutes utilizing 4-(methylthio)butane derivatives having the formula

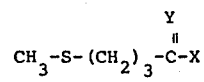

wherein X is hydrogen and Y is a carbonyl oxygen; X is hydroxy and Y is two hydrogen atoms or a carbonyl oxygen; or X is lower alkoxy and Y is (a) carbonyl oxygen or (b) hydrogen and lower alkoxy, together with novel compositions to effectuate such methods.

7 Claims, No Drawings

COMPOSITIONS AND METHODS UTILIZING THIO DERIVATIVES AND PROCESSES FOR PRODUCING SUCH DERIVATIVES

This is a division of application Ser. No. 301,524, filed Oct. 27, 1972.

BACKGROUND OF THE INVENTION

The present invention relates to novel methods of altering the organoleptic properties of tobacco and tobacco substitutes, and to compositions for effecting such methods, such constituting a number of derivatives of (methylthio)butane.

Various 4-(methylthio)butyl derivatives are known. Thus, 4-(methylthio)butanol is shown in *Chemical Abstracts* 55, 1191; 4-(methylthio)butyric acid, in *Chemical Abstracts* 44, 6943; the diethyl acetal of 4-(methylthio)butyraldehyde, in *Chemical Abstracts* 54, 9772; and the same or similar materials are also shown in *Chemical Abstracts* 55, 20927; 70, 115563; and 68, 53398. While some of the materials have been suggested for use as plasticizers, there has been no suggestion of such methylthiobutyl derivatives for use in altering tastes or aromas, nor are tastes or aromas suggested.

Methional, 3-(methylthio)propionaldehyde, has been said to be widely distributed in common natural foods, and it is said to be used in a number of imitation flavors, mainly cheese, meat and fruit flavors as well as in spice blends and concentrated soup flavors. It is said in Arctander, *Perfume and Flavor Chemicals*, that it has a powerful and diffusive onion- and meat-like odor. The taste in concentrations of less than 5 ppm is said to be pleasant warm meat- or soup-like with a "bite" or pungency at higher concentrations. It has also been said to be productive of potato flavor under certain conditions of use. Methionol, 3-(methylthio)propanol, is said to have been found in soysauce and is stated in Arctander, loc.cit., to have a powerful and sweet soup- or meat-like odor and flavor.

The reduction of esters to aldehydes with diisobutyl aluminum hydride has been shown in *Tetrahedron Letters* 14, 619, and the use of a material comprising sodium dihydro bis-(2-methoxyethoxy) aluminate has been suggested as a reducing agent to reduce carbonyl compounds to alcohols. *Chemical Abstracts* 55, 20927 shows a process for the production of 4-(methylthio)-butyraldehyde diacetal from the reaction of the 1,1-diethoxy-3-butene with methyl mercaptan in the presence of ultra-violet radiation or a mercuric oxide catalyst. Other syntheses of materials are shown in *Chemical Abstracts* 47, 11227; 47, 1723; 58, 11211; 50, 16785; 45, 10198; 44,9919; 57, 12303; 67, 43362; 55, 25829; 57, 7289; and 76, 2516.

THE INVENTION

The present invention affords methods for imparting various vegetable and mushroom flavors to tobacco and tobacco substitutes. Briefly, the methods, of the present invention contemplate the addition of a small but effective amount of at least one 4-(methylthio)butane derivative having the formula

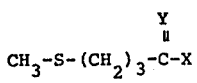

wherein X is hydrogen, and Y is a carbonyl oxygen; X is hydroxy and Y is a carbonyl oxygen or two hydrogen atoms; or X is lower alkoxy and Y is (a) carbonyl oxygen or (b) lower alkoxy and hydrogen, sufficient to alter the organoleptic properties of the tobacco and tobacco substitutes.

The alkoxy groups encompassed by X and Y in the foregoing formula are preferably lower alkoxy groups containing from 1 to about 3 carbon atoms. In certain preferred embodiments of the invention described herein, the preferred alkoxy groups are methoxy and ethoxy. It will be appreciated by those skilled in the art from the present description that certain preferred compounds for use herein are provided according to the foregoing formula when Y is carbonyl and X is hydrogen, hydroxy, methoxy or ethoxy; when Y is two hydrogen atoms and X is hydroxy; and when Y is hydrogen and methoxy or ethoxy and X is methoxy or ethoxy.

Thus, the present invention contemplates the use of 4-(methylthio)butanol having a metallic character to provide a mushroom-like, tomato-like, vegetable-like, cheesy, fruity taste; 4-(methylthio)butanal to impart a metallic, tomato-potato, fish oil-like, cabbage taste; 4-(methylthio)butyric acid having a metallic, tin can, tomato-like odor and green vegetable flavor with metallic note; the methyl ester of 4-(methylthio)butyric acid to provide a sweet, roasted, nut-like, dairy, vegetable-like taste; the ethyl ester of 4-(methylthio)butyric acid to provide sweet metallic fruity, cheesy, onion-like flavor and aroma character; and the diethylacetal of 4-(methylthio)-butyraldehyde, also known as 1,1-diethoxy-4-(methylthio)-butane, to provide a mushroom, heated onion flavor with green, sweet tomato with onion and garlic fragrance nuances.

It will be appreciated from the present disclosure that the (methylthio)butane derivatives and mixtures thereof according to the present invention can be used to alter, vary, fortify, modify, enhance, or otherwise improve the flavor and/or aroma of a wide variety of materials which are ingested, consumed, or otherwise organoleptically sensed. The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor or aroma impression to modify the organoleptic character.

Such 4-(methylthio)butane derivatives are accordingly useful in flavoring compositions. Such flavoring compositions are herein taken to mean those which contribute a part of the overall flavor impression by supplementing or fortifying a natural or artifical flavor in a material, as well as those which supply substantially all the flavor and/or aroma character to a consumable article.

The term "foodstuff" as used herein includes both solid and liquid ingestible materials for man or animals, which materials usually do, but need not, have nutritional value. Thus, foodstuffs includes meats, gravies, soups, convenience foods, malt and other alcoholic or nonalcoholic beverages, milk and dairy products, nut butters such as peanut butter and other spreads, seafoods including fish, crustaceans, mollusks and the like, candies, breakfast foods, baked goods, vegetable, cereals, soft drinks, snack foods, dog and cat foods, other veterinary products, and the like.

The term "tobacco" will be understood herein to mean natural products such as, for example, burley, Turkish tobacco, Maryland tobacco, flue-cured tobacco and the like including tobacco-like or tobacco-based products such as reconstituted or homogenized leaf and the like, and the term "tobacco substitutes" will mean those materials intended to replace natural tobacco, such as lettuce and cabbage leaves and the like. The tobaccos and tobacco products include those designed or used for smoking such as in cigarette, cigar, and pipe tobacco, as well as products such as snuff, chewing tobacco, and the like.

When the 4-(methylthio)butane derivatives according to this invention are used in a flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners, and flavor intensifiers.

Such conventional flavoring material include saturated, unsaturated, fatty and amino acids; alcohols, including primary and secondary alcohols; esters, carbonyl compounds, including ketones and aldehydes; lactones; cyclic organic materials including benzene derivatives, alicyclics, heterocyclics such as furans, thiazoles, thiazolidines, pyridines and the like; other sulfur-containing materials including thiols, sulfides, disulfides and the like; proteins; lipids; carbohydrates; so-called flavor potentiators such as monosodium glutamate, guanylates, and inosinates; natural flavoring materials such as cocoa, vanilla, and caramel; essential oils and extracts such as anise oil, clove oil and the like; artificial flavoring materials such as vanillin; and the like.

It has been found in certain preferred embodiments that various adjuvants are particularly suited for use with various (methylthio)butane derivatives according to the present invention. Thus, 4-(methylthio)butanol at levels of 0.1 to 2 ppm has a considerable advantage in enhancing the flavor of vegetable and mushroom products and in overcoming flour and starch flavor notes in, for example, soups. The 4-(methylthio)butanal has similar utility. In tobacco formulations, the butyric esters and particularly the ethyl ester of 4-(methylthio)butyric acid has the advantage of providing excellent fruit flavors while permitting the use of high levels of acetaldehyde, levels as much as tenfold those which can otherwise be used.

In view of the utility of compounds according to the present invention for tomato, potato, cheese, and mushroom and for enhancing meat flavors, it is preferred in certain embodiments that the 4-(methylthio)-butane derivative or derivatives be combined with one or more adjuvants such as 2-isobutylthiazole, 2-isobutyl-3-methoxypyrazine, maltol, 4-methyl-5-thiazolol, 2,4-pentadienal, 4-hydroxy-2,5-dimethyl-2H-furan-3-one, 2-methyl-3-furanthiol, 2-ethyl-3-acetylpyrazine, or allyl caproate.

Stabilizers include preservatives such as sodium chloride and the like, antioxidants such as calcium and sodium ascorbate, ascorbic acid, butylated hydroxyanisole, butylated hydroxytoluene, propyl gallate and the like, sequestrants such as citric acid, EDTA, phosphates, and the like.

Thickeners include carriers, binders, protective colloids, suspending agents, emulsifiers and the like, such as agar-agar, carrageenan, cellulose and cellulose derivatives such as carboxymethyl cellulose and methyl cellulose, and the like, and other proteinaceous materials, lipids, carbohydrates, starches and pectins.

Surface active agents include emulsifying agents such as mono- and/or diglycerides of fatty acids including capric acid, caprylic acid, palmitic acid, myristic acid, oleic acid, and the like, lecithin, defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like; buffers and neutralizing agents such as sodium acetate, ammonium bicarbonate, ammonium phosphate, citric acid, lactic acid, vinegar and the like; colorants such as carminic acid, cochineal, turmeric, curcumin, approved food and drug dyes, and the like; firming agents such as aluminum sodium sulfate, calcium chloride and calcium gluconate; texturizers; anticaking agents such as aluminum calcium sulfate and tribasic calcium phosphate; enzymes; yeast foods such as calcium lactate and calcium sulfate; nutrient supplements such as iron salts including ferric phosphate, ferric pyrophosphate, ferrous gluconate and the like, riboflavin, vitamins, zinc sources such as zinc chloride, zinc sulfate, and the like.

The 4-(methylthio)butane derivatives, or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The methylthiobutane compounds can be incorporated with the carriers by conventional means such as spray-drying, drum-drying, and the like. Such carriers can also include materials for coacervating the butane derivatives (and other flavoring ingredients, as present) to provide encapsulated products. When the carrier is an emulsion, the flavoring composition can also contain emulsifiers such as mono-and diglycerides of fatty acids and the like. With these carriers or vehicles, the desired physical form of the composition can be prepared.

It will be understood by those skilled in the art that the 4-(methylthio)butane derivatives according to the present invention can be added to the materials to be flavored at any convenient point in the production of the finished product. Thus, when the derivatives are used to alter or otherwise vary the flavor of the foodstuff, they can be added in the original mixture, dough, emulsion, batter, or the like prior to any cooking or heating operation. Alternatively, they can be added at a later stage of processing if volatilization losses would be excessive during the earlier processing.

When the derivatives are used to treat tobacco products for example, the additive can be applied in a suitable manner, as by spraying, dipping, or otherwise.

They can be applied during the "casing" or final spray treatment of the tobacco, or they can be applied at some earlier stage of curing or preparation. The quantity of 4-(methylthio)-butane derivatives or mixtures thereof utilized should be sufficient to impart the desired flavor characteristic to the product, but on the other hand, the use of an excessive amount of the derivative is not only wasteful and uneconomical, but in some instances too large a quantity may unbalance the flavor or other organoleptic properties of the product consumed. The quantity used will vary depending upon the ultimate foodstuff, tobacco product, or other consumable product; the amount and type of flavor initially present in the product; the further process or treatment steps to which the product will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff, tobacco, or other consumable material.

It is accordingly preferred that the ultimate compositions contain from about $10^{-3}$ parts per million (ppm) to about 200 ppm of methylthiobutane derivative or derivatives. More particularly, in food compositions it is desirable to use from about 0.01 ppm for enhancing flavors and in certain preferred embodiments of the invention, from about 1 to 25 ppm of the derivatives are included to add positive flavors to the finished product. On the other hand, tobacco compositions can contain as little as 0.01 ppm and as much as 200 ppm depending upon whether a cigarette tobacco, a pipe tobacco, a cigar tobacco, a chewing tobacco, or snuff is being prepared. All parts, proportions, percentages, and ratios herein are by weight unless otherwise indicated.

The amount of methylthiobutyl material or materials to be utilized in flavoring compositions can be varied over a wide range depending upon the particular quality to be added to the foodstuff, tobacco, or other consumable material. Thus, amounts of one or more derivatives according to the present invention from about 0.1 ppm up to 80 or 90 percent can be incorporated in such compositions. It is generally found to be desirable to include from about 0.1 ppm to about 0.1 percent of the derivatives in such compositions.

The (methylthio)butane derivatives of this invention are also useful individually or in admixtures as fragrances. They can be used to contribute various fruity, woody, or floral fragrances. As olfactory agents, the derivatives of this invention can be formulated into or used as components of a "perfume composition".

A perfume composition is composed of a small but effective amount of a (methylthio)butane derivative according to this invention and an auxiliary perfume ingredient, including, for example, alcohols, aldehydes, ketones, nitriles, esters, and frequently hydrocarbons which are admixed so that the combined odors of the individual components produce a pleasant or desired fragrance. Such perfume compositions usually contain (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation, and (d) top-notes which are usually low-boiling fresh smelling materials.

In perfume compositions the individual component will contribute its particular olfactory characteristics, but the overall effect of the perfume composition will be the sum of the effect of each ingredient. Thus, the individual derivatives of this invention, or mixtures thereof, can be used to alter the aroma characteristics of a perfume composition, for example, by highlighting or moderating the olfactory reaction contributed by another ingredient in the composition.

The amount of the compounds of this invention which will be effective in perfume compositions depends on many factors, including the other ingredients, their amounts and the effects which are desired. It has been found that perfume compositions containing as little as 0.2 percent of the compounds of this invention, or even less, can be used to impart a scent odor to soaps, cosmetics, and the other products. The amount employed can range up to 5 percent or higher of the fragrance components and will depend on consideration of cost, nature of the end product, the effect desired on the finished product and the particular fragrance sought.

The derivatives of this invention can be used alone or in a perfume composition as an olfactory component in detergents and soaps; space odorants and deodorants; perfumes; colognes; toilet waters; bath preparations such as bath oil and bath salts; hair preparations such as lacquers, brilliantines, pomades, and shampoos; cosmetic preparations such as creams, deodorants, hand lotions, and sun screens; powders such as talcs, dusting powders, face powder, and the like. When used as an olfactory component of a perfumed article, as little as 100 ppm of one or more of the preferred 4-(methylthio)-butane derivatives will suffice to impart a floral, geranium odor character. Generally, no more than 0.5 percent is required in the perfume composition.

In addition, the perfume composition or fragrance composition can contain a vehicle or carrier for the 4-(methylthio)butane derivatives alone or with other ingredients. The vehicle can be a liquid such as alcohol, glycol, or the like. The carrier can be an absorbent solid such as gum or components for encapsulating the composition.

It will thus be apparent that the derivatives according to the present invention can be utilized to alter the sensory properties, particularly organoleptic properties such as flavor and/or fragrance of a wide variety of consumable materials.

The present invention further provides novel processes for the preparation of certain compounds used herein. The 4-(methylthio)butanal can be obtained from the diethoxybutene by reaction with methyl mercaptan and subsequent acid hydrolysis. The acetal starting material is prepared by reacting triethyl orthoformate with allyl magnesium chloride. The acetal so obtained is then admixed with methyl mercaptan and exposed to ultra-violet radiation. This provides 4-(methylthio)butyraldehyde diacetal which is then reacted with dilute acid to obtain 4-(methylthio)butanal.

The ultra-violet irradiation is carried out at temperatures of from about −40° to about 40°C in order to give good completeness with control of the reaction velocity. The reaction can be carried out under atmospheric or super-atmospheric conditions, and atmospheric pressure is preferred. The ratio of mercaptan to acetal can vary over a range of from several times the molar quantity of mercaptan to several times the molar quantity of acetal. In certain desired embodiments of the invention, the amounts of the two reactants range from about equimolar to a 20 molar percent excess of mercaptan.

If desired, the reaction can be carried out in the presence of a reaction vehicle, but it is usually desirable to use little or no reaction vehicle. The time of reaction will vary depending upon the completeness desired, the temperature, the pressure, the ratio of reactants and like variables. With the radiation intensities normally available in the laboratory and small-scale production, reaction times of 30 minutes to four hours are utilized.

After the thio derivative has been formed, and if desired purified as herein described, it is treated with a dilute acid to provide the aldehyde. A wide variety of acid materials can be used, and mineral acids such as phosphoric, hydrochloric and sulfuric are desirable. Particularly preferred is concentrated sulfuric acid which has been diluted with from about four to about 25 times its volume of water.

The treatment to provide the aldehyde is carried out at temperatures of from about 0° to about 50°C, and temperatures or the order of 25°C are preferred. At such temperatures the reaction is carried out in from 1 to 8 hours.

The intermediate and/or final products obtained can be purified or isolated by conventional purification after appropriate washing, neutralizing and/or drying as appropriate. Thus, such products can be purified and/or isolated by distillation, steam distillation, vacuum distillation, extraction, crystallization, preparative chromatographic techniques, and the like.

The 4-(methylthio)butanol utilized herein can also be prepared by a direct reduction of a 4-(methylthio)-butyric acid ester. Organometallic hydrides are used to provide the desired aldehyde as the final product. Examples of preferred reducing agents are dialkyl aluminum hydrides such as diisobutyl aluminum hydride and bis(alkoxyalkyl) dihydro aluminate such as bis-(methoxyethyoxy) dihydro aluminate. This last material is available under the trade bis-(methoxyethoxy) "RED-AL" from Aldrich Chemical Company, Milwaukee, Wisconsin, U.S.A.

The reduction directly to provide the aldehyde is carried out at relatively low temperatures on the order of −100° to −10°C. In certain preferred embodiments, dry ice-solvent baths are used and the preferred temperatures are from about −70° to about −50°C. The reaction is carried out for from 1 to about 20 hours to provide good reaction completeness. It is generally desirable to gradually raise the temperature to provide for completeness of the reaction while at the same time providing good control thereof.

It is usually desirable to carry out the reaction in an inert vehicle which moderates the course of the reaction. Such a reaction vehicle is one which will not be reduced by, or otherwise react with, the materials present and which is liquid at the relatively low temperatures utilized. It has been found desirable to use a vehicle in which the reactants are soluble. Thus, suitable reaction vehicles include ethers such as diethyl ether, liquid hydrocarbons such as hexane and the like, aromatic hydrocarbons such as a benzene-diethyl ether mixture, toluene and the like, and similar materials.

This reaction can be carried out over a range of pressures from atmospheric to super-atmospheric, but it is generally preferred to conduct the reaction at −70°C. It is also desirable to exclude moisture rigorously from the reaction mixture and it can accordingly be beneficial to carry out the reaction under a blanket of inert gas such as nitrogen. After the reaction is completed, the aldehyde product produced is separated from the by-products and isolated and/or purified as set forth above.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of Ethyl 4-(Methylthio)butyrate

A 500 ml flask equipped with mechanical stirrer, thermometer, reflux condenser, and dropping funnel, is charged with 500 ml of ethyl alcohol and 25 g of sodium spheres. The alcohol is distilled into a second three-neck, 500 ml flask equipped with magnetic stirrer, dry ice condenser, and calcium chloride drying tube. The second flask containing the distilled alcohol is charged with 14.4 g (0.625 moles) of pure freshly cut sodium, and 31.2 g (0.65 moles) of methylmercaptan is distilled into the flask.

The mixture so obtained is transferred to a dropping funnel on another 500 ml flask containing 68.3 (0.5 moles) of methyl 4-chloro-butyrate. The mercaptide solution is dropped into the flask while maintaining a temperature of 20°C. When the reaction is completed, the liquid is filtered and the ethanol is removed on a rotary evaporator. The slurry remaining after evaporation is added to 200 ml of ethyl ether, and this is followed by the addition of 200 ml of water. The aqueous layer is extracted with ethyl ether and combined with the other ether layer, and the combined layers are extracted with water until neutral.

The 50 g of ethyl 4-(methylthio)butyrate obtained boils at 74°–75°C and 13 mm Hg.

EXAMPLE II

Preparation of 4-(Methylthio)butanol

A three-neck 500 ml flask equipped with a mechanical stirrer, dropping funnel, and thermometer, and flushed with nitrogen, is charged with 16.8 g (0.104 moles) of ethyl 4-(methylthio)butyrate and 150 ml of ethyl ether. The flask contents are cooled to −70°C and 15 ml of a 70 percent solution of sodium dihydro bis-(methoxyethoxy) aluminate in benzene mixed with 25 ml of ethyl ether is added during a 20-minute period. The reaction mixture is maintained at −70°C for 6 hours.

Thereafter, 100 ml of sulfuric acid diluted with five parts by volume of water is added during a 20-minute period. The temperature is allowed to rise to 0°–10°C. The lower aqueous layer is separated from the ether and extracted thrice with 100 ml portions of ether.

The ether extracts are combined and washed with 20 ml of 5 percent aqueous sodium carbonate solution. The ether solution is dried with anhydrous magnesium sulfate and filtered, and the ether is then removed on a rotary evaporator.

The remaining organic material is distilled to obtain 4-(methylthio)butanol boiling at 96°–99°C and 26 mm Hg.

EXAMPLE III

Preparation of Methyl 4-(Methylthio)butyrate

The procedure of Example 1 is repeated utilizing 73.75 g (0.625 moles) of sodium methoxide, 31.2 g (0.65 moles) of methyl mercaptan and 68.3 g (0.5 moles) of methyl 4-chloro-butyrate. The methyl 4-(methylthio)butyrate is obtained in the amount of 29 g having a boiling point of 86°C at 15 mm Hg. The product is over 96 percent pure, and the structure is confirmed by mass spectroscopy.

EXAMPLE IV

Preparation of 4-(Methylthio)butanol

The procedure of Example II is repeated utilizing 22.2 g (0.15 moles) of methyl 4-(methylthio)butyrate, 67.5 ml (0.225 moles) of the reducing agent, 225 ml of ethyl ether and 500 ml of the dilute sulfuric acid. The reaction is run for 17 hours at −70°C.

The procedure provides 8 g of 4-(methylthio)butanol.

EXAMPLE V

Preparation of Methyl 4-(Methylthio)butyrate

A 500 ml three-flask equipped with mechanical stirrer, dry ice condenser, and calcium chloride drying tube is charged with 350 ml of absolute methanol and cooled to 10°C before adding 73.75 g (0.625 moles) of sodium methoxide. The methoxide is added in batches during 1 hour while the temperature is maintained at 20°C. An additional hour of stirring is necessary to effect complete solution.

A 250 ml flask is charged with 31.2 g (0.65 moles) of chilled methyl mercaptan, and the mercaptan is allowed to distill into the aforementioned flask during a one-half hour period. The mixture so obtained is transferred to a dropping funnel on a 500 ml three-neck flask equipped with mechanical stirrer, thermometer, reflux condenser, and dropping funnel. This last flask is charged with 68.3 g (0.5 moles) of methyl 4-chlorobutyrate. The mercaptide solution is added during one-half hour while the temperature is maintained at 20°C. The mixture is then stirred for an additional hour as the temperature rises to 35°C.

The solids are then removed from the reaction mixture by suction filtration, and the remaining solution is placed in a rotary evaporator to remove the methanol. The liquid-solid mixture is treated with 200 ml of ether and 200 ml of water.

The two phases are separated, the aqueous layer is extracted thrice with ether, and the ether layers are combined. The combined layers are extracted with 20 ml portions of water until neutral. The solvent is removed on a rotary evaporator and a two-phase system is obtained. The organic material is dissolved in 100 ml of ether, the layers are separated, and the ether is removed to obtain 43 g of methyl 4-(methylthio)butyrate. Gas-liquid chromatography (GLC) shows the product to be substantially 100 percent pure.

EXAMPLE VI

Preparation of 4-(Methylthio)butanol

A 1-liter, three-neck round bottom flask equipped with a mechanical stirrer, thermometer, nitrogen blanket and dropping funnel is charged with 22.2 g (0.15 moles) of methyl 4-(methylthio)butyrate in 225 ml of ethyl ether and cooled to −70°C with a dry ice-acetone bath. A 70 percent solution in benzene of sodium dihydro bis(methoxyethoxy) aluminate in the amount of 30 ml in 100 ml ethyl ether is added to the flask contents during one-half hour while the temperature is maintained at −70° to −65°C.

The reaction mixture is then stirred for 3 additional hours, after which time 500 ml of aqueous sulfuric acid diluted 1:1 with water is added. The addition begins at −70°C and the temperature at the end of the acid addition is −10°C. The flask contents are charged to a one-liter separatory funnel, the upper organic phase is separated, and the lower aqueous phase is extracted thrice with ether. The ether extract is combined with the organic phase, and the combined layers are extracted with 20 ml of 5 percent aqueous sodium carbonate. The ether is then dried and stripped on a rotary evaporator. The remaining material is distilled to provide about 5 g of 4-(methylthio)-butanol as a liquid boiling at 87°C and 25 mm Hg.

EXAMPLE VII

Preparation of Methyl 4-(Methylthio)butyrate

A 1-liter, three-neck flask equipped with mechanical stirrer, thermometer, dry ice condenser, and drying tube, is charged with 700 ml of methanol and cooled to −15°C with a dry ice-isopropanol bath. After the methanol is chilled, 141.6 g (1.2 moles) of sodium methoxide is added during one-half hour while the temperature is maintained at 20°C or less. A 500 ml flask is charged with 62.4 g (1.3 moles) of methyl mercaptan and attached to the reaction flask, whereafter the methyl mercaptan is distilled into the reaction flask during one-half hour.

The mixture so obtained is transferred to a 1 liter dropping funnel and the funnel is placed on a 2 liter, three-neck flask equipped with thermometer, mechanical stirrer, and drying tube and containing 136.6 g (1.0 moles) of methy 4-chlorobutyrate and 100 ml of methanol. The sodium methyl mercaptide solution in the dropping funnel is added to the butyrate solution during one-half hour while the reaction temperature is maintained at from 15° to 20°C. After addition of mercaptide solution is completed the mixture is allowed to reach 35°C by the exothermic reaction during 1 hour while the mixture is stirred.

After the additional exothermic period the methanol is removed by rotary evaporation, the solid-liquid mixture remaining is dissolved in 600 ml of water, and the solution so obtained is extracted with ether. The ether extract is dried and evaporated to provide 40 g of 95.1 percent pure methy 4-(methylthio)butyrate as a liquid boiling at 92° – 94°C and 17 mm Hg.

EXAMPLE VIII

Preparation of Methyl 4-(Methylthio)butyrate

A two-liter, three-neck flask equipped with mechanical stirrer, thermometer, dry ice condenser, and calcium sulfate drying tube is charged with one-liter of methanol cooled to 20°C and then with 97.9 g (0.83 moles) of sodium methoxide during one-half hour while the temperature is maintained at 20°C by cooling with a dry ice-isopropanol bath. Then 48 g of methyl mercaptan is distilled into the sodium methoxide-methanol mixture without cooling.

The resulting clear solution is charged to a 1 liter dropping funnel on a 2 liter, three-neck flask equipped with a mechanical stirrer, thermometer, and calcium sulfate drying tube, the 1 liter flask containing 113.6 g (0.83 moles) of methyl 4-chlorobutyrate in 100 ml of methanol. The sodium methyl mercaptide solution in the dropping funnel is added during one-half hour while the temperature of 20°C is maintained with slight cooling. When addition of the mercaptide solution is completed the exothermic reaction is allowed to warm the flask contents to 30°C. The flask contents are then heated to 60°C over one-half hour and cooled to 30°C. The sodium chloride produced in the reaction is filtered off by suction, and the methanol is removed by rotary evaporation. The remaining liquid-solid mixture is extracted twice with 400 ml of ether and once with 200 ml of water. The ether is dried and removed.

The remaining liquid is distilled to obtain 58 g of methyl 4-(methylthio)butyrate having a boiling point of 84°–85°C at 15 mm Hg and a refractive index of 1.4647 at 25°C.

EXAMPLE IX

Preparation of 4-(Methylthio)butanol

A 3 liter, three-neck flask equipped with mechanical stirrer, thermometer, dropping funnel, and nitrogen blanket, is charged with 74 g (0.5 moles) of methyl 4-(methylthio)-butyrate in 100 ml of ethyl ether and cooled to −70°C. One hundred milliliters of a 70 percent benzene solution of sodium dihydro bis-(methoxyethoxy) aluminate in 100 ml of ethyl ether is added during one-half hour while the solution is maintained at −70°C, and the solution is then stirred at −70°C for four hours after the 100 ml (0.5 moles) of aluminate has been added. Thereupon, one-liter of sulfuric acid diluted 1:5 with water is slowly added while the temperature is raised from −70° to −10°C.

The resulting mixture is charged to a four-liter separatory funnel, the upper organic phase is separated, and the lower aqueous phase is extracted thrice with 200 ml portions of ether. All of the organic phases are combined and extracted with 20 ml of 5 percent aqueous sodium carbonate. The ether is then dried and removed upon a rotary evaporator.

The remaining material is distilled to provide a 13 g portion containing 78.5 percent of 4-(methylthio)-butanal product, 26.5 g of material containing 51.5 percent product, and 1 g of material containing 14.8 percent product.

EXAMPLE X

Preparation of 1,1-Diethoxy-3-butene

A 12-liter reaction flask equipped with a reflux condenser, mechanical stirrer, dropping funnel, a drying tube and isopropanol cooling bath, is charged with 448 g of magnesium turnings and 0.5 liters of diethyl ether.

The reaction mass is stirred and exothermed to reflux, whereupon 5.5 liters of diethyl ether and a solution of 1380 g of allyl chloride in 3 liters of diethyl ether is added.

The addition is carried out over 4 hours at such a rate that the diethyl ether is refluxed, while the reaction vessel is cooled with the dry ice-isopropanol bath at −20°C. When the addition is complete the resulting reaction mass is refluxed for 30 minutes, and 2520 g of triethyl orthoformate is added over 1½ hours.

The reaction mass is then refluxed for seven hours. The reflux condenser is thereupon replaced by a distillation head and seven liters of diethyl ether is removed from the reaction mass until the pot temperature is 75°C. The resulting thick slurry is cooled to 25°C and 5 liters of a 6 percent aqueous hydrochloric acid solution is slowly added while maintaining a pot temperature of 35°–40°C.

The resulting acidic solution is transferred to a 5-gallon separatory funnel and the lower aqueous phase is removed. The upper organic phase is extracted with 5 percent aqueous sodium bicarbonate solution until the organic phase has a neutral pH. The organic phase is then dried over anhydrous sodium sulfate and placed in a 3-liter distillation apparatus. The material is fractionated and the 1,1-diethoxy-3-butene product is distilled at 82°C and 100 mm Hg pressure.

EXAMPLE XI

Preparation of 1,1-Diethoxy(4-Methylthio)butane

A 2 liter, three-neck flask equipped with a magnetic stirrer, dry ice condenser, and thermometer and 450 W high pressure Hanovia UV lamp is charged with 1083 g (7.52 moles) of 1,1-diethoxy-3-butene (prepared by the process of Example X).

The contents of the flask are cooled to 0°C and 384 g (8 moles) of methanethiol is added. Using a dry ice-isopropanol cooling bath as well as a condenser, the temperature of the reaction mass is maintained at 0°C.

The UV light is directed at the flask for a period of 10 minutes, and the temperature of the reaction mass is allowed to rise to +10°C at which point the UV light is shut off. The reaction mixture is then cooled to −5°C and the UV light is again turned on and the reaction mass is exposed to UV light for another 10 minutes, at which point the reaction temperature rises to 40°C. The UV light is then shut off and the reaction mass is cooled to 10°C, whereupon the UV light is turned on for 10 minutes and the temperature of the reaction mass is allowed to increase to 60°C. The UV light is then shut off, the reaction mass is cooled to 0°C, and an additional 50 grams of methanethiol is added. The UV light is then turned on for another 10 minutes and the reaction mass temperature is permitted to rise to 20°C.

The reaction mass is then flash-evaporated under 100 mm Hg vacuum at a temperature of 30°C to obtain 1443 g of 1,1-diethoxy-4-(methylthio)butane. The structure is confirmed by IR, NMR and mass spectral analysis.

EXAMPLE XII

Preparation of 1,1-Diethoxy-4-(Methylthio)butane

A 100 ml, two-neck quartz flask equipped with a dry ice condenser and nitrogen blanket is charged with 57.6 g (0.4 moles) of 1,1-diethoxy-3-butene and 20 g (0.42 moles) of methyl mercaptan. The mixture is then cooled to 0°C with an isopropanol-dry ice bath. The flask contents are irradiated with ultra-violet light from a Hanovia UV lamp for 13 hours while the bath temperature is maintained at 0° to 40°C.

The resulting product is distilled to obtain 66.6 g of 80 percent pure 1,1-diethoxy-4-(methylthio)-butane liquid boiling at 72° and 1.5 mm Hg.

EXAMPLE XIII

Preparation of 4-(Methylthio)butanol

A 5-gallon separatory funnel fitted with a mechanical stirrer is charged with 10 liters of distilled water, 300 ml of concentrated sulfuric acid, and 1400 g of 1,1-diethoxy-4-(methylthio)butane (produced by the process of Example XI).

The ingredients are stirred in the separatory funnel at a temperature of 25°C for a period of 2 hours.

The reaction mass is then extracted with three one-liter portions of methylene chloride. The methylene chloride layer is separated, dried over anhydrous sodium sulfate, and evaporated down by rotary evaporation using a water aspirator to obtain 1188 g of crude material. The crude is then transferred to a two-liter distillation unit and distilled at a temperature of 80°–82°C at 20 mm Hg pressure to yield 660 g (75 percent of theory) having a refractive index of 1.4785 at 25°C. The structure is confirmed by IR, NMR and mass spectral analysis.

EXAMPLE XIV

Use of 4-(Methylthio)butanol 4-(Methylthio)butanol is added to a commercially available tomato soup at the rate of 0.5 ppm and compared by a bench panel (consisting of four people) with an unflavored control. It is concluded that the 4-(methylthio)-butanol adds a tomato paste-character to the soup, increasing the intensity of the tomato taste. The soup flavored with 4-(methylthio)butanol is preferred.

EXAMPLE XV 4-(Methylthio)butanol is added to a commercially available mushroom soup at the rate of 1.0 ppm and compared by a bench panel (consisting of four individuals) with an unflavored control. The soup flavored with 4-(methylthio)butanol has a stronger mushroom aroma and taste (masking the starch and flour notes present) and is preferred as being more mushroom-like.

EXAMPLE XVI

Use of 4-(Methylthio)butanal 4-(Methylthio)butanal is added to a commercially available tomato soup at the rate of 1 ppm. The 4-(methylthio)butanol is found to add the aroma and taste of fresh tomatoes to the soup, overcoming the flour and starch notes of the soup.

EXAMPLE XVII

Use of Ethyl 4-(Methylthio)butyrate

Ethyl 4-(methylthio)butyrate is added to a cooked cheese sauce prepared by admixing the following materials:

| Ingredient | Amount (grams) |
| --- | --- |
| Hydrolyzed vegetable power, Nestle | 3.5 |
| Cheddar cheese powder | 11.5 |
| Corn starch | 13.5 |
| Monosodium glutamate | 6.5 |
| Sodium citrate | 1.0 |
| Table salt | 4.0 |
| Whey | 60.0 |

The butyrate is added at the rate of 0.5 ppm and 50 g of the formulation is added to 250 ml of milk and heated to boiling under continuous stirring. The cheese aroma is increased adding notes which are usually present in surface-ripened cheese and also increasing the cheese flavor intensity.

EXAMPLE XVIII

Use of Methyl 4-(Methylthio)butyrate

One ppm methyl 4-(methylthio)butyrate is added to beef broth prepared from a commercial dried mixture and 250 ml hot water. The methyl 4-(methylthio)butyrate increases the meat character and enhances the spice note. The resultant beef broth has an improved more blended meaty flavor than does the unflavored beef broth.

EXAMPLE XIX

Use of Methyl 4-(Methylthio)butyrate

Methyl 4-(methylthio)butyrate is added to a prepared New England clam chowder at the rate of 4 ppm (1 mg/250 ml). The sample to which the methyl 4-(methylthio)butyrate is added has an enhanced fish flavor as compared to a control to which no methyl 4-(methylthio)-butyrate is added.

EXAMPLE XX

The following tobacco flavor is prepared:

| Ingredient | Amount (parts) |
| --- | --- |
| Ethyl 4-(methylthio)butyrate | 10.00 |
| Allyl caproate | 20.00 |
| Orange oil, Florida | 100.00 |
| Δ-Decalactone | 5.00 |
| Ethyl acetoacetate | 15.00 |
| Amyl acetate | 5.00 |
| Ethyl butyrate | 10.00 |
| Acetaldehyde | 25.00 |
| Ethyl caproate | 10.00 |
| Amyl caproate | 10.00 |
| Ethyl propionate | 10.00 |
| Aqueous ethyl alcohol (95%) | 780.00 | the mixture is added to tobacco at the rate of 0.25 percent. The ethyl 4-(methylthio)butyrate enhances the pineapple character of this fruity flavor for tobacco. The ethyl 4-(methylthio)butyrate also enables the acetaldehyde level to be raised tenfold as compared to the permissible acetaldehyde levels in ordinary fruit flavors for tobacco.

EXAMPLE XXI

The following perfume formulation is prepared:

| Ingredient | Amount (parts) |
| --- | --- |
| Ethyl 4-(methylthio)butyrate | 5.00 |
| 4-(Methylthio)butanol | 10.00 |
| Benzyl alcohol | 50.00 |
| Benzyl acetate | 100.00 |
| 4-(4-Methyl-4-hydroxyamyl)cyclohex-3-ene carboxaldehyde | 20.00 |
| 6-Oxa-1,1,2,3,3,8-hexamethyl-2,3,5,6-7,8-hexahydro-1H-benz(f)-indene | 5.00 |
| Linalool | 80.00 |
| Linalyl acetate | 40.00 |
| Indol | 2.00 |
| Methyl anthranilate | 3.00 |
| Terpeneol | 5.00 |
| Farnesol | 20.00 |
| Nerolidol | 5.00 |
| Dimethyl benzyl carbinyl isobutyrate | 1.00 |

EXAMPLE XXI – Continued

| Ingredient | Amount (parts) |
|---|---|
| Balsam tolyl | 3.00 |
| Oil bitter orange | 5.00 |

The ethyl 4-(methylthio)butyrate imparts a fruity, ylang jasmin note to this floral essential oil composition. The 4-(methylthio)butanol imparts a green celery jasmin note to this composition.

EXAMPLE XXII

The follwing perfume formulation is prepared:

| Ingredient | Amount (parts) |
|---|---|
| 1,1-Diethoxy-4-(methylthio)butane | 3.00 |
| Methyl 4-(methylthio)butyrate | 10.00 |
| 4-(Methylthio)butanol | 5.00 |
| Hexyl cinnamic aldehyde | 20.00 |
| Benzyl acetate | 10.00 |
| 4-(4-Methyl-4-hydroxyamyl)cyclohex-3-ene carboxaldehyde | 5.00 |
| Benzyl benzoate | 15.00 |
| Linalool | 50.00 |
| Eugenol | 5.00 |
| Linalyl acetate | 60.00 |
| Indol | 1.00 |
| Benzyl alcohol | 10.00 |
| Terpeneol | 3.00 |
| Sandalwood oil | 1.00 |

The 1,1-diethoxy-4-(methylthio)butane imparts a green, galbanum note to this floral type essential oil formulation. The methy 4-(methylthio)butyrate imparts a sweet ylang note. The 4-(methylthio)butanol imparts a green jasmin character to the overall floral character.

What is claimed is:

1. A flavored tobacco or tobacco substitute product comprising tobacco or a tobacco substitute and a fruit flavor altering amount of at least one 4-(methylthio)-butane derivative having the formula

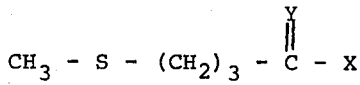

wherein X is hydrogen and Y is carbonyl oxygen; X is hydroxy and Y is two hydrogen atoms or a carbonyl oxygen; or X is lower alkoxy and Y is (a) carbonyl oxygen or (b) hydrogen and lower alkoxy, the alkoxy groups containing from one to three carbon atoms, the flavoring constituting approximately 0.01 ppm to about 200 ppm of the composition.

2. A method for altering the fruit flavor of a tobacco or tobacco substitute product which comprises adding a small amount of at least one 4-(methylthio)-butane derivative having the formula

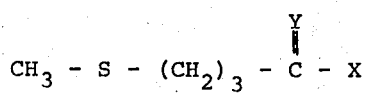

wherein X is hydrogen and Y is carbonyl oxygen; X is hydroxy and Y is two hydrogen atoms or a carbonyl oxygen; or X is lower alkoxy and Y is (a) carbonyl oxygen or (b) hydrogen and lower alkoxy, the alkoxy groups containing from one to three carbon atoms, sufficient to alter the fruit flavor properties of the tobacco or tobacco substitute product, the flavoring consitituting approximately 0.01 ppm to about 200 ppm of the composition.

3. A method according to claim 2 wherein X is hydrogen and Y is a carbonyl oxygen.

4. A method according to claim 2 wherein X is hydroxy and Y is two hydrogen atoms.

5. A method according to claim 2 wherein X is hydroxy and Y is carbonyl oxygen.

6. A method according to claim 2 wherein X is an alkoxy group and Y is a hydrogen atom and an alkoxy group, the alkoxy groups each having one or two carbon atoms.

7. A method according to claim 2 wherein X is an alkoxy group having one or two carbon atoms and Y is carbonyl oxygen.

* * * * *

UNITED STATES PATENT OFFICE
CERTIFICATE OF CORRECTION

PATENT NO. : 3,895,640

DATED : July 22, 1975

INVENTOR(S) : ALAN O. PITTET, JOHN V. PASCALE, STUART PATTON and MICHAEL H. BRODNITZ It is certified that error appears in the above-identified patent and that said Letters Patent are hereby corrected as shown below:

Col. 3, line 33, after "pyridines" insert --, pyrazines--

Col. 7, line 36; col. 10, line 22; col. 13, line 49; and col. 15, line 30, in each occurrence, correct the spelling of "butanal".

Col. 8, Example II; col. 9, Example VI; col. 11, Example IX; and col. 13, Example XIII, in the Title of each Example correct the spelling of "butanal"

Col. 7, line 44, after "trade" insert --name-- and cancel the rest of the line.

Col. 10, lines 43 and 56; and col. 15, line 29, correct the spelling of "methyl"

Signed and Sealed this ninth Day of March 1976

[SEAL]

Attest:

RUTH C. MASON
*Attesting Officer*

C. MARSHALL DANN
*Commissioner of Patents and Trademarks*